United States Patent [19]
Barone

[11] 3,873,625
[45] Mar. 25, 1975

[54] PREPARATION OF HYDROPEROXIDES BY AUTOXIDATION
[75] Inventor: Bruno J. Barone, Houston, Tex.
[73] Assignee: Petro-Tex Chemical Corporation, Houston, Tex.
[22] Filed: Apr. 28, 1971
[21] Appl. No.: 138,334

[52] U.S. Cl............. 260/610 B, 260/597 R
[51] Int. Cl............................. C07c 73/06
[58] Field of Search...... 260/610 B, 604 AC, 593 R, 260/586 B, 610 A

[56] References Cited
UNITED STATES PATENTS

| | | | |
|---|---|---|---|
| 2,376,257 | 5/1945 | La Comble | 260/610 B |
| 2,792,426 | 5/1957 | Weesner | 260/610 B |
| 2,954,405 | 9/1960 | Hock et al. | 260/610 B |
| 3,634,328 | 1/1972 | Brownstein | 260/610 B |

FOREIGN PATENTS OR APPLICATIONS

| | | | |
|---|---|---|---|
| 565,693 | 11/1958 | Canada | 260/610 B |
| 777,501 | 6/1957 | United Kingdom | 260/610 B |
| 1,076,132 | 8/1954 | Germany | 260/610 B |
| 529,429 | 8/1954 | Italy | 260/610 B |
| 906,347 | 12/1945 | France | 260/610 B |

Primary Examiner—Bernard Helfin
Assistant Examiner—W. B. Lone
Attorney, Agent, or Firm—N. Elton Dry; Kenneth H. Johnson

[57] ABSTRACT

In autoxidation of tertiary, aryl or cycloalkanes the selectivity for organic hydroperoxides can be substantially increased by carrying out the reaction in the presence of metal-free phthalocyanine or chlorophyll. For example, an autoxidation of isopentane with 0.05 wt. % phthalocyanine at 9.1 mole % conversion gave selectivities of t-amyl hydroperoxides - 83.6 mole % acetone - 12.3 mole % and t-amyl alcohol - 1.7 mole %. The same reaction without the phthalocyanine at 10.0 mole % conversion gave selectivities of t-amyl hydroperoxide - 56.8 mole % acetone - 31.2 mole % and t-amyl alcohol - 4.8 mole %.

5 Claims, No Drawings

3,873,625

PREPARATION OF HYDROPEROXIDES BY AUTOXIDATION

BACKGROUND OF THE INVENTION

The present invention relates to the preparation of the hydroperoxides of tertiary alkanes, aralkanes and cycloalkanes. More particularly it relates to the autoxidation of tertiary alkanes, aralkanes and cycloalkanes in the presence of a selected group of chromophores. The term autoxidation is understood to mean the reaction of a substance with molecular oxygen without the intervention of a flame. The hydroperoxides of tertiary, aryl and cycloalkanes have been prepared by autoxidation. Generally the results of these preparations have been rather discouraging. Two comprehensive reviews of the prior art of peroxides are "Organic Peroxides, their formation and reactions," E. G. E. Hawkins, D. Van Nostrand Company, Inc., Princeton, N.J. 1961, and "Organic Peroxides," A. G. Davies, Butterworths, London 1961, which are incorporated herein insofar as they describe the prior art.

Most known autoxidation reactions for the tertiary, aryl and cycloalkanes have relatively low selectivities for the hydroperoxides. Generally the product of such oxidations has been a mixture of oxidation products, e.g., the aldehydes, ketones, alcohols, acids, hydroperoxides, water and carbondioxide. If the desired product is a hydroperoxide then the production of such by-products and the necessity of removing some or all of them from the hydroperoxide makes an economically unattractive process. A preferable process would be one that had high selectivity for the hydroperoxide with few and relatively low concentrations of by-products. Such a process would be attractive even if low conversions were necessitated, since the hydrocarbon starting material makes an excellent diluent for the potentially dangerous hydroperoxide. Very often a product such as that described above can be used directly or with a minimum of treatment for the purification and concentration of the hydroperoxide.

It is an object of this invention to provide an improved process for the autoxidation of tertiary alkanes, aralkanes and cycloalkanes to produce hydroperoxides. It is a further object to provide a process which has high selectivity for hydroperoxides. These and other objects will become apparent from the discussion below.

SUMMARY OF THE INVENTION

It has been found that organic hydroperoxides can be obtained by a process comprising contacting a tertiary alkane, aralkane or cycloalkane with molecular oxygen in liquid phase in the presence of metal-free phthalocyanine or chlorophyll.

It is theorized without intending any limitation to the scope of the present invention that the function of the chromophore is at least two-fold in the reaction. First, the compound serves to absorb any metal ions in the reaction medium thus reducing the possibility of further oxidation, which may be catalyzed by such stray ions and secondly, in a similar manner it absorbs acids that are formed, reducing the possibility of side reaction acid catalysis.

Generally, the metal-free phthalocyanine or chlorophyll will be employed in very low concentrations. The chromophore compound can be of some value in concentrations as low as 0.025 weight percent based on the hydrocarbon feed. Excellent results have been obtained in the 0.05 weight percent range based on the hydrocarbon feed. Generally no more than 1.0 weight percent of the chromophore would be employed and preferably .5 or less weight percent. It has been observed that there is a decrease in the selectivity of the reaction for hydroperoxides as the conversion is increased in the presence of a given amount of chromophore. The effect on hydroperoxide selectivity can be somewhat mitigated by the use of additional quantities of chromophore. Within the specified ranges one skilled in the art will be able to select the quantity of chromophore for a desired product distribution at a desired economic cost and ease of operation.

The process of the present invention is used for the preparation of hydroperoxides from tertiary alkanes, aralkanes and cycloalkanes. Suitably, the tertiary alkanes and cycloalkanes would have from 3 to 30 carbon atoms, preferably 4 to 10 and most preferably 5 to 8 carbon atoms. The carbons on the tertiary carbon atom may be primary, secondary or tertiary, thus there may be more than one tertiary carbon atom in a compound. Some examples of tertiary alkanes intended to be included are isobutane, isopentane, 2-methyl pentane, 3-methyl hexane, 2,3-dimethyl hexane, 4-methyl heptane, 4-n-propyl heptane, 3-tertiary butyl-hexane, 2-methyl decane, 2,6-dimethyl-3-isopropyl heptane, 2,11-dimethyl dodecane, 2-methyl-heptadecane, 7-isopropylhexadecane, 4, -n-propyl-nonadecane, 10-n-nonyl-n-nonadecane and the like. The cycloalkane may be mono, di or tri cyclo, etc. unsubstituted or substituted with hydrocarbons. The hydrocarbon substituent will usually contain 1 to 10 carbon atoms and may be branched or unbranched. Suitable cycloalkanes include for example cyclopropane, propylcyclopropane, 1-methyl 2(2 -methyl propyl) cyclopropyl, cyclobutane, 1,2-dimethylcyclobutane, 1,2-diisopropylcyclobutane, cyclopentane, ethyl cyclopentane, cyclohexane, 1,2,4-trimethyl cyclohexane, propylcycloheptane, cyclooctane, methylcyclooctane, cycloundecane, cyclododecane, cyclooctadecane, cyclotriacontane, cyclopentylcyclopentane, cyclopentylcyclohexylmethane, bicyclohexane, [0,3,3]-bicyclooctane, perhydrophenanthrene, 1,3-dimethyl 7-isopropyl-2, 3-(3-methyl-cyclohexane)-0,4,4] -bicyclodecane and the like. The aralkane will generally have one or two aromatic groups and includes, for example, ethyl benzene, cumene, o-cymene, 2-ethyl naphthalene, 2-ethyl-6-methyl naphthalene and the like. A particularly preferred group of hydrocarbons for use in the present process are isobutane, isopentane, isohexane, isoheptane, isooctane, ethylbenzene, cumene, cyclopentane, cyclohexane and cycloheptane.

As stated above, the tertiary alkane may contain secondary and other tertiary groups, likewise, the aralkane and the cycloalkane can contain various hydrocarbon substituents as well as more than one cyclic structure. Such highly branched and substituted hydrocarbons are generally suitable for the present process, however, it should be borne in mind that presence of more than one tertiary group on the tertiary alkane or the aralkane or the presence of alkyl substituents, particularly tertiary substituents on the cycloalkane, can result in a great profusion of products since the number of principal active sites is increased with each substitution. That is not to say that all of the sites even of the same or similar grouping will possess the same degree of activity.

Other factors such as the electron density, steric and kinetic considerations, and the like, may for the most part control such activity. In any event, it should be expected that use of exotic or complex hydrocarbon starting materials will probably give lower selectivities to the desired hydroperoxides. In the present examples such complicating reactions are largely avoided by the use of a relatively simple tertiary alkane, i.e., isopentane, which will demonstrate the type of reaction and the advantages that can arise from the present process.

The reactions of the present process result in hydroperoxides corresponding to the starting hydrocarbon. Since the tertiary carbon is the most reactive in the autoxidation, the product is almost entirely the tertiary hydroperoxide. The secondary carbon atom in unsubstituted cycloalkanes are similar to the tertiary groups and react accordingly, however, a tertiary carbon is the preferred reaction site in the substituted cycloalkanes. The following examples will demonstrate the reaction: Isobutane to tertiary butyl hydroperoxide, isopentane to tertiary-amyl hydroperoxide, isohexane to tertiary-hexyl hydroperoxide, ethyl benzene to $\alpha$-phenyl ethyl hydroperoxide, cyclopentane to cyclopentyl hydroperoxide, decalin to decalin-4'-hydroperoxide.

The present reaction is an autoxidation carried out at somewhat elevated temperatures. Generally the temperatures which are most suitable for the oxidation will be between about 135°–170°C. and more preferably about 140°–160°C. In autoxidations there is usually an induction period during which the reaction proceeds very slowly. During this period the production of hydroperoxide is slow, however, when a sufficient concentration of hydroperoxide is achieved the reaction is initiated at its "real" reaction rate. The induction period can be reduced by the use of high initial temperatures, i.e., 160°–170°C. which will allow the rapid buildup of hydroperoxide. However, once the reaction is initiated the temperature is reduced, e.g., 140°–160°C. Temperatures higher than 170°C. should not be employed after the reaction has been initiated since the possibility of further oxidation of the peroxide is enhanced. A preferred temperature range for the reaction is 145° to 170°C.

The induction period mentioned above can also be reduced by the addition of an initiator such as some of the hydroperoxide product to be produced. Other initiators are free radical initiators such as $\alpha$-methyl benzyl hydroperoxide, $\alpha$-methyl-p-methylbenzenyl hydroperoxide, $\alpha$-methyl-$\alpha'$-n-propyl-p-xylene dihydroperoxide, ethyl acetoacetate, phenylacetone, acetylacetone and the like.

The autoxidation is carried out by contacting the tertiary alkane in liquid phase at the temperatures and conditions set out herein with molecular oxygen. The oxygen can be furnished as pure oxygen or in gases containing oxygen, e.g., air or mixtures of oxygen with inert gases, such as helium or nitrogen in the same or substantially different proportions as oxygen is found in air.

Sufficient pressure is employed so as to maintain the reaction mixture in liquid phase. This will usually require more than atmospheric pressure, althouth some of the hydrocarbons encompassed herein are liquid at atmospheric pressure at temperatures up to 170°C. Generally, however, pressure will be required. It is not necessary to use any more pressure than is necessary to maintain the liquid phase since oxygen is not believed to be the rate determining factor in the reaction. Pressures of atmospheric up to about 1,000 psi will usually be sufficient.

Diluents can be used, for example, benzene, toluene, xylene, naphthalene, tert-butyl alcohol, tert-amyl alcohol, nitrobenzene, carbon tetrachloride, and the like. It should be noted that such diluent will decrease the rate of reaction. Generally, the unreacted feed material will be a sufficient diluent for this reaction. The usual metal oxidation catalysts should not be present during the present reaction and any solvent should be examined to be sure it is free of such contaminants.

In carrying out the process it has been found that the best results are obtained when the chromophore compound is thoroughly dispersed in the reaction medium. This is best achieved by agitation of the reaction medium, for example, by high speed stirring. An aid to maintaining the dispersion would be the use of very fine powders such as below about 20 micron size. The chromophore compounds are easily recovered since they are solid in the reaction system. The presence of residual phthalocyanine or chlorophyll in the product is not, however, detrimental, but is advantageous in that these compounds stabilize the hydroperoxides.

The following examples will illustrate the operation of the invention and the advantages to be derived therefrom. The apparatus used in each of the following examples was a 3,000 psi magnetically stirred, 1.4 liter, stainless steel autoclave, equipped with a Dispersamax agitator, reflux condenser and internal water cooling coil. The isopentane feed, and other materials for the reaction were charged to the reactor. Oxygen containing gas was added continuously with sufficient pressure to maintain the liquid phase. Inlet gas was measured by following the pressure drop in a standardized metering vessel and fed into the autoclave through a ballast type pressure regulator. Exit gas, at atmospheric pressure, was then passed through three dry ice traps, an ascarite trap, a wet test meter and then vented. Pure oxygen was employed in the present examples unless otherwise indicated. Analysis of the product was by gas chromatography. Hydroperoxide content was determined by iodometric analysis of the original oxidate.

EXAMPLES 1–6

These examples demonstrate the improvement obtainable according to the present invention using metal-free phthalocyanine or chlorophyll as the catalyst in the autoxidation of isopentane. The reactants, quantities, conditions and results are set out below in the TABLE. Example 1 is a control. The examples show the wide range of suitable concentrations for the catalyst.

TABLE

OXIDATION OF ISOPENTANE UNDER 600 PSI OXYGEN PRESSURE

| Example | 1 | 2 | 3 | 4 | 5 | 6 | 7 |
|---|---|---|---|---|---|---|---|
| Reactants | | | | | | | |
| Isopentane, g. | 600 | 600 | 600 | 600 | 600 | 600 | 600 |
| Phthalocyanine, Metal free, g. | — | 3.0 | 3.0 | 0.6 | 0.6 | 0.3 | — |
| Chlorophyll, g. | — | — | — | — | — | — | 0.5 |

TABLE—Continued

OXIDATION OF ISOPENTANE UNDER 600 PSI OXYGEN PRESSURE

| Example | 1 | 2 | 3 | 4 | 5 | 6 | 7 |
|---|---|---|---|---|---|---|---|
| Reaction Conditions | | | | | | | |
| Temperature, °C. | 140 | 140 | 150 | 150 | 150 | 150 | 140 |
| Total Reaction Time, hrs. | 4.17 | 4.17 | 4.33 | 4.08 | 6.07 | 4.92 | 10.2 |
| Results | | | | | | | |
| Induction Period, Min | 176 | (a) | 109 | 156 | 220 | 161 | 492 |
| Oxygen Consumed, Mole | 1.098 | | 1.008 | 0.985 | 0.974 | 0.972 | 1.233 |
| Carbon Dioxide Produced, Mole | 0.020 | | 0.013 | 0.022 | 0.008 | 0.019 | 0.027 |
| Hydroperoxide Concentration, wt.% | 7.98 | | 10.26 | 8.35 | 10.82 | 9.37 | 9.28 |
| Isopentane Conversion, % | 10.0 | | 9.8 | 7.9 | 9.1 | 8.0 | 10.7 |
| % Selectivity (Mole Product/100 Mole Hydrocarbon Consumed) | | | | | | | |
| Acetone | 31.2 | | 16.0 | 20.1 | 12.3 | 13.4 | 18.9 |
| Tertiary Amyl Alcohol | 4.8 | | 7.0 | 0.2 | 1.7 | 0.6 | 14.4 |
| Tertiary Amyl Hydroperoxide | 56.8 | | 71.6 | 75.3 | 83.6 | 83.8 | 61.5 |

(a) No reaction

The invention claimed is:

1. A process for preparing organic hydroperoxides comprising contacting a tertiary alkane, aralkane or cycloalkane selected from the group consisting of isobutane, isopentane, isohexane, isoheptane, isooctane, ethyl benzene, cumene, cyclopentane, cyclohexane and cycloheptane with molecular oxygen in liquid phase at a temperature of 145°–170°C. in the presence of from about 0.025 to 1.0 weight percent based on the tertiary alkane, aralkane or cycloalkane feed of solid metal-free phthalocyanine as a fine powder below about 20 micron size dispersed in the reaction mixture.

2. The process according to claim 1 wherein the temperature is between 150°–160°C.

3. The process according to claim 1 wherein the pressure is sufficient to maintain the liquid phase.

4. The process according to claim 3 wherein the pressure is atmospheric to about 1,000 psi.

5. The process according to claim 1 wherein the tertiary alkane is isopentane and the hydroperoxide is tertiary amyl hydroperoxide.

* * * * *